United States Patent
Bernard et al.

(10) Patent No.: US 10,538,462 B2
(45) Date of Patent: Jan. 21, 2020

(54) METHOD FOR THE CONTINUOUS PRODUCTION OF A LOW-DENSITY MINERAL FOAM

(71) Applicant: LAFARGE, Paris (FR)

(72) Inventors: Freddy Bernard, Eyzin (FR);
Pierre-Henri Jezequel, Lyons (FR);
Sandrine Reboussin, Lyons (FR)

(73) Assignee: HOLCIM TECHNOLOGY LTD, Jona (CH)

( * ) Notice: Subject to any disclaimer, the term of this patent is extended or adjusted under 35 U.S.C. 154(b) by 228 days.

(21) Appl. No.: 15/538,877

(22) PCT Filed: Dec. 18, 2015

(86) PCT No.: PCT/FR2015/053620
§ 371 (c)(1),
(2) Date: Jun. 22, 2017

(87) PCT Pub. No.: WO2016/102838
PCT Pub. Date: Jun. 30, 2016

(65) Prior Publication Data
US 2017/0349498 A1    Dec. 7, 2017

(30) Foreign Application Priority Data

Dec. 23, 2014 (FR) ..................................... 14 63226

(51) Int. Cl.
*C04B 38/02*  (2006.01)
*C04B 28/04*  (2006.01)
(Continued)

(52) U.S. Cl.
CPC ............... *C04B 38/02* (2013.01); *B05D 1/26* (2013.01); *B05D 3/002* (2013.01); *C04B 14/28* (2013.01);
(Continued)

(58) Field of Classification Search
None
See application file for complete search history.

(56) References Cited

FOREIGN PATENT DOCUMENTS

FR    2 708 592 A1    2/1995
FR    2 986 790 A     8/2013
(Continued)

OTHER PUBLICATIONS

Search Report as issued in French Patent Application No. 1463226, dated Sep. 15, 2015.
(Continued)

*Primary Examiner* — Nathan T Leong
(74) *Attorney, Agent, or Firm* — Pillsbury Winthrop Shaw Pittman LLP

(57) ABSTRACT

A method for the continuous production of a mineral foam of which the density in the dry state (d) is from 40 to 600 $kg/m^3$, includes (i) mixing cement; a water reducing agent; 0.5 to 10%, % by weight with respect to the total weight of cement, of ultrafine particles having a liquid-solid contact angle comprised from 30° to 140°, and of which the D50 is from 10 to 600 nm; water, with a water/cement weight ratio from 0.3 to 2.5; (ii) adding to the mixture from 0.5 to 10% of a pore-forming agent, % by weight with respect to the weight of cement; (iii) applying the mixture obtained at step (ii) on a support; (iv) leaving the mixture to expand on the support.

18 Claims, 2 Drawing Sheets

(51) Int. Cl.
*B05D 1/26* (2006.01)
*B05D 3/00* (2006.01)
*C04B 14/28* (2006.01)
*C04B 22/12* (2006.01)
*C04B 24/26* (2006.01)
C04B 111/40 (2006.01)
C04B 111/52 (2006.01)
C04B 103/10 (2006.01)
C04B 103/30 (2006.01)
C04B 103/42 (2006.01)

(52) U.S. Cl.
CPC ............ *C04B 22/124* (2013.01); *C04B 24/26* (2013.01); *C04B 28/04* (2013.01); C04B 2103/10 (2013.01); C04B 2103/302 (2013.01); C04B 2103/42 (2013.01); C04B 2111/40 (2013.01); C04B 2111/52 (2013.01); C04B 2201/30 (2013.01)

(56) References Cited

FOREIGN PATENT DOCUMENTS

| | | | |
|---|---|---|---|
| JP | 2008-189526 | * | 8/2008 |
| JP | 2008-189526 A | | 8/2008 |
| WO | WO 2006/018569 A2 | | 2/2006 |
| WO | WO 2007/134349 A1 | | 11/2007 |
| WO | WO200134349 | * | 11/2007 |

OTHER PUBLICATIONS

International Search Report as issued in International Patent Application No. PCT/FR2015/053620, dated Mar. 1, 2016.

* cited by examiner

METHOD FOR THE CONTINUOUS PRODUCTION OF A LOW-DENSITY MINERAL FOAM

CROSS-REFERENCE TO RELATED APPLICATIONS

This application is the U.S. National Stage of International Application Serial No. PCT/FR2015/053620, filed Dec. 18, 2015, which in turn claims priority to French Application No. 1463226, filed Dec. 23, 2014. The contents of all of these applications are incorporated herein by reference in their entirety.

The present invention relates to a method for the continuous production of a low density mineral foam based on cements, as well as the use of said foam as insulating material.

Generally speaking, mineral foam is very advantageous for numerous applications on account of its thermal insulation properties. Mineral foam designates a material in the form of a foam. This material is lighter than traditional concrete due to the pores or empty spaces that it comprises, it may also be termed cement foam. These pores or empty spaces are due to the presence of a gas in the mineral foam and may be in the form of bubbles. In fact with 1 m$^3$ of raw material, it is possible to produce around 5 m$^3$ of finished product, i.e. a material composed of 20% of material and 80% of gas (valid for an element of density of 400 kg/m$^3$). Thus, the mineral foam comprises a network of bubbles more or less distant from each other, that is to say gas pockets contained in a solid envelope of mineral binder.

The production of mineral foams is delicate because it results from the solidification from a liquid foam into a solid foam. This solid foam being firstly a liquid foam, that is to say a network of air or gas bubbles encircled by a hydraulic binder grout which changes over time into a solid mineral foam. Also the production of mineral foams involves the passage by a step of production of a liquid foam which must be stable. The stability of the liquid foam is thus important, and it is necessary that the production method can control the phenomena of destabilisation of the foams during setting, such as for example coalescence, Ostwald ripening or drainage. These difficulties are exacerbated when the production method is a continuous method, that is to say that the finished product is elaborated in an uninterrupted manner. Continuous production methods are well suited to an industrial environment and are recommended in plants or on work sites.

The difficulty in the continuous production of mineral foams in an industrial context is thus to produce a stable foam offsetting these destabilisation phenomena. Yet, known methods for the production of foams do not make it possible to obtain sufficiently stable foams.

In addition, when this mineral foam is used as insulating material, it is advantageous that it can be projected onto a support, said support being able to be just as easily horizontal, sloping or vertical. It then becomes interesting that the foam adheres to this support and that it remains joined together with this support up to its solidification. Indeed, when the foam is in the liquid state, it can flow under the effect of gravity and it is important that once on its support, said foam does not flow or does not fall under the effect of gravity.

In order to meet user requirements, it has become necessary to find a method for the continuous production of a mineral foam in an industrial context or on a work site, with facilitated application of said foam.

Also, the problem that the invention proposes solving is finding a method for the continuous production of a mineral foam, said foam being able to remain in place when it is applied on a support, regardless of the shape and the slope of the support.

The invention also relates to a mineral foam capable of being obtained according to the method of the invention.

According to another object of the invention, the mineral foam according to the invention may be used as building material. For example, the mineral foam may be used as insulator, projected or not, or as an element for filling structures.

The present invention aims to provide novel mineral foams that have one or more of the following characteristics:
- the mineral foam according to the invention has excellent stability properties. Notably it is possible to obtain a foam that can be projected and adhere to a support, whatever the position of this support and independently of gravity forces;
- the mineral foam according to the invention has excellent thermal properties, and notably a very low thermal conductivity. Reducing the thermal conductivity of building materials is very desirable since it makes it possible to obtain a heating energy saving in residential or working buildings. In addition, this reduction makes it possible to reduce thermal bridges, particularly in constructions of buildings with several floors and having a thermal insulation from the interior, notably the thermal bridges of intermediate floors.

The present invention relates to a method for the continuous production of a mineral foam of which the density in the dry state (d) is comprised from 40 to 600 kg/m$^3$, comprising the following steps:
(i) mixing
   cement;
   a water reducing agent;
   0.5 to 10%, % by weight with respect to the total weight of cement, of ultrafine particles having a liquid-solid contact angle comprised from 30° to 140°, and of which the D50 is comprised from 10 to 600 nm;
   water, with a water/cement weight ratio comprised from 0.3 to 2.5;
(ii) adding to the mixture from 0.5 to 10% of a pore-forming agent, % by weight with respect to the weight of cement;
(iii) applying the mixture obtained at step (ii) on a support;
(iv) leaving the mixture to expand on the support.

The cement suitable for producing the mineral foam according to the method of the invention is preferably the cement described in accordance with the European standard NF EN 197-1 of April 2012 or mixtures thereof. The preferred cement suitable according to the invention is CEM I Portland cement, alone or mixed with other cements such as those described in accordance with the European standard NF EN 197-1 of April 2012.

Preferably, the mixture of step (i) of the method according to the invention comprises from 60 to 95% of cement, preferentially from 65 to 90%, percentage by weight with respect to the total weight of the mixture of step (I) without water.

A calcium aluminate cement could also be suitable for producing the mineral foam according to the invention. It could be a cement comprising a $C_4A_3\$$, CA, $C_{12}A_7$, $C_3A$ or $C_{11}A_7CaF_2$ mineralogical phase or mixtures thereof, such as for example Fondu® cements, sulphoaluminate cements, calcium aluminate cements in accordance with the European standard NF EN 14647 of December 2006, the cement obtained from clinker described in the patent application WO 2006/018569 or mixtures thereof. The calcium aluminate cement suitable for producing the mineral foam according to the invention could be either in crystallised form or in amorphous form.

The preferred calcium aluminate cement according to the invention is the Fondu® cement.

Preferably, the cement of the mixture of step (i) of the method according to the invention has a Blaine specific surface area greater than or equal to 5000 cm$^2$/g, more preferentially greater than or equal to 6500 cm$^2$/g. Preferably, the cement of the mixture of step (i) of the method according to the invention is a cement of which the Blaine specific surface area is comprised from 5000 to 9000 cm$^2$/g.

It may be envisaged to use several cements in the mixture of step (i) of the method according to the invention of different Blaine specific surface areas. For example, a cement of Blaine specific surface area greater than or equal to 5000 cm$^2$/g may be used, mixed with a cement of Blaine specific surface area less than or equal to 5000 cm$^2$/g, for example a Portland cement.

The cement which can be used according to the present invention may be ground and/or separated (by a dynamic separator) in order to obtain a cement having a Blaine specific surface area greater than or equal to 5000 cm$^2$/g. This cement may be qualified as ultrafine. The cement may for example be ground according to 2 methods.

According to a first method, the cement or the clinker may be ground until a Blaine specific surface area from 5000 to 9000 cm$^2$/g is obtained. A second generation or third generation high efficiency separator, or a very high efficiency separator, may be used in this first step to separate cement having the desired fineness and to discard cement not having the desired fineness. This cement is then sent into the mill.

According to a second method, a cement may go through a very high efficiency separator, designated VHF (very high fineness), in order to separate the particles of cement having a Blaine specific surface area greater than or equal to the target fineness (the target fineness being greater than 5000 cm$^2$/g) and the particles of cement having a Blaine specific surface area less than the target fineness. The particles of cement having a Blaine specific surface area greater than or equal to the target fineness may be used as such. The particles of cement having a Blaine specific surface area less than the target fineness may be excluded or milled separately until the desired Blaine specific surface area is obtained. The mills that may be used in the two methods are for example a ball mill, a vertical mill, a roller press, a horizontal mill (for example of Horomill© type) or an agitated vertical mill (for example of Tower Mill type).

The mixture of step (i) of the method according to the invention could also contain calcium sulphate, which may be gypsum, anhydrous calcium sulphate or semihydrate calcium sulphate.

The mixture of step (i) of the method according to the invention comprises a water reducing agent, a plastifier or a superplastifier. A water reducing agent makes it possible to reduce by around 10 to 15% by weight the quantity of mixing water for a given workability time. As an example of water reducing agent may be cited lignosulphonates, hydroxycarboxylic acids, carbohydrates, and other specific organic compounds, such as for example glycerol, polyvinyl alcohol, sodium alumino-methyl siliconate, sulphanilic acid and casein (see Concrete Admixtures Handbook, Properties Science and Technology, V. S. Ramachandran, Noyes Publications, 1984).

Superplastifiers belong to the new generation of water reducing agents and make it possible to reduce by around 30% by weight the quantity of mixing water for a given workability time. As an example of superplastifier, it is possible to cite superplastifiers of PCP type without antifoaming agent. The term "PCP" or "polycarboxylate polyoxide" is taken to mean according to the present invention, among others, a copolymer of acrylic acids or methacrylic acids; and their esters of poly(ethylene oxide) (POE).

Preferably, the mixture of step (i) of the method according to the invention comprises from 0.01 to 1%, more preferentially from 0.05 to 0.5%, of a water reducing agent, a plastifier or a superplastifier, percentage expressed by weight with respect to the weight of the mixture of step (i).

When the water reducing agent, the plastifier or the superplastifier is used in solution, the quantity is expressed in active ingredient in the solution.

According to an alternative embodiment of the invention, the mixture of step (i) or of step (ii) of the method according to the invention does not comprises an antifoaming agent, or any agent having the property of destabilising an air emulsion in a liquid. Some commercially available superplastifiers may contain antifoaming agents and consequently these superplastifiers would not be suitable according to the invention.

The mixture of step (i) or of step (ii) of the method according to the invention could comprise a retarding agent. The retarding agent corresponds to the definition of the setting retarder mentioned in the European standard NF EN 934-2 of September 2002.

According to an alternative embodiment of the invention, the mixture of step (i) or of step (ii) of the method according to the invention does not comprise a foaming agent.

Preferably, the mixture of step (i) or of step (ii) of the method according to the invention further comprises a transition metal salt, for example a manganese salt or an iron salt. It may be envisaged that the transition metal salt could be a catalyst precursor facilitating the decomposition of the pore-forming agent into oxygen. As an example of catalyst precursor, manganese salts and oxides may be cited, such as for example permanganates and manganates, salts and oxides of iron, of cobalt, of copper, of molybdenum, of tungsten, of chromium, of silver and enzymes preferably catalases. In certain cases, the transition metal salt may be supplied by the cement itself, when it is notably a cement containing a lot of iron, whether it is in the form of oxide or not.

The catalyst precursor may notably be selected from manganese salts (II) soluble in water, such as manganese acetate (II), manganese sulphate (II), manganese chloride (II) and manganese nitride (II). These salts can decompose, in a basic medium, into insoluble compounds comprising manganese with a +4 degree of oxidation, such as $MnO_2$, which is a known catalyst for the decomposition of peroxides.

The mixture of step (i) of the method according to the invention comprises from 0.5 to 10%, % by weight with respect to the total weight of cement, of ultrafine particles having a liquid-solid contact angle comprised from 30° to 140°, and of which the D50 is comprised from 10 to 600 nm.

Preferably, the mixture of step (i) of the method according to the invention comprises from 1 to 9%, % by weight with respect to the total weight of cement, of ultrafine particles having a liquid-solid contact angle comprised from 30° to 140°, and of which the D50 is comprised from 10 to 600 nm.

Preferably, the mixture of step (i) of the method according to the invention comprises from 2 to 8%, % by weight with respect to the total weight of cement, of ultrafine particles having a liquid-solid contact angle comprised from 30° to 140°, and of which the D50 is comprised from 10 to 600 nm.

Preferably, the ultrafine particles of the mixture of step (i) of the method according to the invention are partially rendered hydrophobic, for example by a stearic acid. It is also possible to speak of functionalisation.

The ultrafine particles of the mixture of step (i) of the method according to the invention have a liquid-solid contact angle comprised from 30° to 140°, preferably comprised from 40° to 130°, even more preferentially from 70° to 130°.

This contact angle is also called wetting angle. The expression "contact angle" or "wetting angle" is taken to mean the angle formed between a liquid/vapour interface and a solid surface. It is the angle formed between the interface of a liquid and the solid surface on which the liquid is deposited. It is generally considered that a wall is hydrophilic when the static contact angle of a drop of water arranged on the wall is less than around 30 degrees and that the wall is hydrophobic at variable hydrophobic levels when the static contact angle of a drop of distilled water arranged on the wall is greater than around 30 degrees and less than around 140°. The wall is designated superhydrophobic when the static contact angle of a drop of distilled water arranged on the wall is greater than around 140 degrees. To produce a foam from the method according to the invention, it would be desirable that the ultrafine particles of the mixture of step (i) are not superhydrophobic, that is to say do not have a contact angle strictly greater than 140°.

Preferably, the ultrafine particles of the mixture of step (i) of the method according to the invention are not hydrophilic.

The ultrafine particles suitable according to the method of the invention have a D50 comprised from 10 to 600 nm, preferably comprised from 20 to 500 nm, more preferentially comprised from 30 to 200 nm. The D50, also noted $D_v 50$, corresponds to the $50^{th}$ percentile of the volume distribution of the size of particles, that is to say that 50% of the volume is constituted of particles of which the size is less than the D50 and 50% of size greater than the D50.

It may be noted that the ultrafine particles generally comprise elementary particles having a diameter comprised from 10 to 50 nm. These elementary particles may agglomerate to form agglomerated particles having a diameter from 40 nm to 150 nm. These agglomerated particles may agglomerate to form aggregates having a diameter from 100 nm to 600 nm.

The ultrafine particles suitable according to the method of the invention may come from one or more materials selected from calcareous powders, precipitated calcium carbonates, natural and artificial pozzolans, pumice stones, ground fly ashes, hydrated silica, in particular the products described in the document FR 2708592, and mixtures thereof.

According to an alternative embodiment, the mixture of step (i) of the method according to the invention further comprises a mineral addition such as a pozzolan, a slag, calcium carbonate, a fly ash, a sand or mixtures thereof, and of which the particles have a D50 comprised from 0.1 to 4 mm.

Preferably, the mixture of step (i) of the method according to the invention may comprise from 15 to 50% of mineral additions, preferably from 15 to 40%, even more preferably from 20 to 35%, the percentages being expressed by weight with respect to the weight of the mixture of step (i).

Preferably the D50 of the particles of mineral additions suitable for the mixture of step (i) of the method according to the invention is comprised from 0.2 to 500 µm, for example from 0.25 to 250 µm. The $D_{50}$ of the mineral particles is preferably from 0.1 to 150 µM, more preferentially from 0.1 to 100 µm.

The mineral additions suitable for the mixture of step (i) of the method according to the invention are selected from calcium carbonate, silica, ground glass, solid or hollow glass beads, glass granules, expanded glass powders, silica aerogels, silica fumes, slags, ground sedimentary silica sands, fly ashes or pozzolanic materials or mixtures thereof.

The mineral additions suitable for the mixture of step (i) of the method according to the invention may be pozzolanic materials (for example as defined in the European standard NF EN 197-1 of February 2001 paragraph 5.2.3), silica fumes (for example such as defined in the European standard NF EN 197-1 of February 2001 paragraph 5.2.7), slags (for example as defined in the European standard NF EN 197-1 of February 2001 paragraph 5.2.2), materials containing calcium carbonate, for example calcareous materials (for example as defined in the European standard NF EN 197-1 paragraph 5.2.6) siliceous additions (for example as defined in the standard "Concrete NF P 18-509", fly ashes (for example those as described in the European standard NF EN 197-1 of February 2001 paragraph 5.2.4) or mixtures thereof.

A fly ash is generally a powdery particle comprised in the fumes from coal-fired thermal power stations. It is generally recovered by electrostatic or mechanical precipitation. The chemical composition of a fly ash mainly depends on the chemical composition of the coal burned and of the method used in the power plant from which it comes. The same is true for its mineralogical composition. The fly ashes used according to the invention may be of siliceous or calcic nature.

Slags are generally obtained by rapid cooling of the molten slag coming from the melting of iron ore in a blast furnace. Slags suitable for the mixture of step (i) of the method according to the invention may be selected from granulated blast furnace slags according to the European standard NF EN 197-1 of February 2001 paragraph 5.2.2.

Silica fumes suitable for the mixture of step (i) of the method according to the invention may be a material obtained by reduction of high purity quartz by carbon in electric arc furnaces used for the production of silica and ferrosilica alloys. Silica fumes are generally formed of spherical particles comprising at least 85% by weight of amorphous silica.

Preferably, the silica fumes suitable for the mixture of step (i) of the method according to the invention may be selected from silica fumes according to the European standard NF EN 197-1 of February 2001 paragraph 5.2.7.

Pozzolanic materials suitable for the mixture of step (i) of the method according to the invention may be natural siliceous or silico-aluminous substances, or a combination thereof. Among pozzolanic materials may be cited natural pozzolans, which are in general materials of volcanic origin or sedimentary rocks, and natural calcinated pozzolans, which are materials of volcanic origin, clays, schists or sedimentary rocks, thermally active.

Preferably, the pozzolanic materials suitable for the mixture of step (i) of the method according to the invention may be selected from pozzolanic materials according to the European standard NF EN 197-1 of February 2001 paragraph 5.2.3.

Preferably, the mineral additions suitable for the mixture of step (i) of the method according to the invention may be calcareous powders and/or slags and/or fly ashes and/or silica fumes. Preferably, the mineral additions suitable for the mixture of step (i) of the method according to the invention are calcareous powders and/or slags.

Other mineral additions suitable for the mixture of step (i) of the method according to the invention are calcareous, siliceous or silico-calcareous powders, or mixtures thereof.

The mineral additions suitable for the mixture of step (i) of the method according to the invention may come in part or in totality from the cement when it is a blended cement.

The mixture of step (i) of the method according to the invention comprises water. The water/cement weight ratio is comprised from 0.45 to 1.3, preferably from 0.5 to 1.2, more preferentially from 0.6 to 0.8. This total water/cement ratio may vary for example due to the water demand of the ultrafine particles or mineral additions when they are used. This total water/cement ratio is defined as being the ratio by weight of the quantity of water (E) over the weight of all the cements (C).

According to an alternative embodiment, the mixture of step (i) of the method according to the invention may comprise hydraulic lime.

Preferably, the mixture of step (i) of the method according to the invention does not comprise light aggregates as described in accordance with the European standard NF EN 206-1 of April 2004, for example perlite.

According to another alternative embodiment of the invention, the mixture of step (i) of the method according to the invention does not comprise light fillers, for example polystyrene beads.

Step (ii) of the method according to the invention comprises the addition to the mixture of step (i) of 0.5 to 10% of a pore-forming agent, % by weight with respect to the weight of cement.

Preferably, step (ii) of the method according to the invention comprises the addition of 2 to 8% of a pore-forming agent.

The pore-forming agent added at step (ii) of the method according to the invention may be a solution of hydrogen peroxide, a solution of peroxomonosulphuric acid, a solution of peroxodisulphuric acid, a solution of alkaline peroxides, a solution of alkaline earth peroxides or a solution of organic peroxide such as peroxoacetic acid or peroxobenzoic acid, or a suspension of aluminium particles or mixtures thereof.

Preferably, the pore-forming agent is hydrogen peroxide. Preferably, it is hydrogen peroxide of which the concentration is comprised from 8% to 35%.

At the end of step (ii) of the method according to the invention a mixture is obtained. This mixture may be produced according to the method of the invention using a device comprising pipes, potentially of different sizes, the whole forming a piping. This piping may comprise or not a mechanical auxiliary to the mixing such as a static mixer. The reaction between the pore-forming agent and the transition metal salt (catalyst precursors) and/or the cement starts immediately, and a fraction of the total oxygen is immediately released, in such a way that the piping contains bubbles. At the output of the piping, the mixture that contains a fraction of bubbles is intended to be immediately poured into a mould or projected onto a support. During this operation of making the mixture come out from the piping, said mixture is not fractionated.

Preferably, the mixture obtained at step (ii) of the method according to the invention is not fractionated.

The expression "is not fractionated", is generally taken to mean that the mixture comes out of the piping in the form of a jet and retains its integrity, and in particular it is not sprayed in the mould or onto the support, even if several occasional drops can form during contact with the support.

Step (iii) of the method according to the invention comprises the application of the mixture obtained at step (ii) on a support. This application step may take place without using spray nozzles or equivalent. In addition, this application may take place without using elements at the output of the device.

In fact the spray will generally end in the fractionation of the mixture or in the formation of drops. The application may take place by leaving the mixture obtained at step (ii) to flow naturally on the support. Thus the mixture, in flowing naturally, is not propelled or accelerated, which could destabilise the mixture and form drops.

Preferably, at step (iii) the mixture is applied without using a spray nozzle.

Preferably, step (iii) of the method according to the invention is carried out without spray.

According to an alternative embodiment of the invention, step (iii) may be repeated in order to obtain successive or superimposed layers. Preferably, the most recently deposited layer is deposited on a layer having already acquired a mechanical strength by hydration of the cement.

The support implemented at step (iii) of the method according to the invention may be vertical, horizontal, sloping or in any position. It may also be a receptacle, a mould, a hollow or solid construction block, a hollow or solid wall, a ceiling, a floor (underfloor form or insulating screed).

The support used at step (iii) of the method according to the invention may be treated prior to the application of the mixture obtained at step (ii).

According to an alternative embodiment, the method according to the invention further uses a hydration accelerator of the cement, which is present either in the mixture of step (i) or (ii), or on the surface of the support of step (iii).

Preferably, the mixture of step (i) of the method according to the invention further comprises a hydration accelerator of the cement, for example calcium chloride.

When a hydration accelerator of the cement is present in the mixture of step (i) or (ii), it is preferably a calcium salt, such as for example calcium chloride. The hydration accelerator of the cement may be incorporated continuously before step (iii) of the method according to the invention.

When a hydration accelerator of the cement is present on the surface of the support of step (iii), it is preferably aluminium sulphate.

The hydration accelerator of the cement may be introduced at step (i) before or after the addition of water, or sprayed onto the support of step (iii).

Water may be applied on the support implemented at step (iii) of the method according to the invention before step (iii).

Other additives may also be used in the method according to the invention such as for example coloured pigments, hydrophobic agents, depolluting agents (for example zeolites or titanium dioxide).

At step (iv) of the method according to the invention, the mixture expands. This expansion has begun as soon as the pore-forming agent chemically reacts, that is to say at step (ii) and ends at step (iv). The aerated mineral foam thereby obtained may be smoothed and have a thickness greater than 1 cm. Then the setting takes place until a solid mineral foam is obtained.

This expansion corresponds to the gaseous release following the chemical reaction of the pore-forming agent, potentially in the presence of a catalyst. When the pore-forming agent is peroxide based, the decomposition reaction of the pore-forming agent carried out in the presence of a catalyst is an exothermic reaction generating oxygen molecules and water. It is in fact known that the decomposition of peroxides is accelerated in the presence of a metal.

The mixture of step (i) may be prepared using mixers conventionally used for producing cement grouts. It may be a grout mixer, a concrete plant mixer, a mixer described in the European standard NF EN 196-1 of April 2006—Paragraph 4.4, or a mixer-beater with planetary movement.

The mixture of step (i) may be prepared by introducing into the mixer the different materials in the form of powders. The powders are mixed to obtain a homogeneous mixture. Then water is introduced into the mixer. Next the mineral particles, the adjuvants such as for example the water reducing agent, the plastifier, the superplastifier, the accelerator, the thixotropic agent, the viscosifier, the water retaining agent or the retarder, are introduced when they are present in the formulation of the mineral foam. The paste obtained is mixed to obtain a mixture of cement grout.

Preferably, the mixtures of step (i) or (ii) are maintained under stirring using the deflocculating blade, throughout the duration of the method for producing the mineral foam according to the invention.

The method according to the invention may be implemented on a worksite by installing a foaming system directly on the worksite, or implemented in a preproduction plant.

The invention also relates to a mineral foam capable of being obtained according to the method of the invention.

Preferably, the mineral foam produced according to the method of the invention has a density in the dry state from 50 to 600 kg/m$^3$, more preferentially from 60 to 500 kg/m$^3$, even more preferentially from 70 to 450 kg/m$^3$. It may be noted that the density of the mineral foam in the fresh state (wet density) differs from the density of the mineral foam in the dry state, that is to say after setting (density of hardened material). The density of the mineral foam in the fresh state is always greater than the density of the foam in the dry state.

The invention offers as advantage that the mineral foam according to the invention has considerable lightness, and notably a very low density.

The invention offers as other advantage that the mineral foam according to the invention has excellent stability properties. Notably the bubbles that compose the mineral foam in the fresh state are little degraded after pouring into the mould or depositing on the support.

The support may be of different natures and different shapes.

The support may be a receptacle to fill. In this case, it is envisaged to fill building blocks with the mineral foam according to the invention. For example, they may be building blocks, terra cotta blocks, cellular concrete blocks that it is wished to fill with the foam according to the invention.

The support may be a wall to cover with mineral foam according to the invention. For example, it may be a concrete cast wall, a shuttered concrete, a wall of building blocks, a wall of terra cotta blocks, a wall of cellular concrete blocks, a wall covered with mortar or coating.

The support may be of different natures such as concrete, terracotta, plaster, untreated wood, plasterboard, cardboard sheet, or any other material used in building.

The support may be treated, or covered with a first layer of mineral foam according to the invention. The support could be treated before deposition of the foam. The treatment could for example consist in one or more projections of water, the projection of setting accelerator solutions such as aluminium sulphate, or in the deposition of bonding primers, or any other solution of physical or chemical nature making it possible to accelerate the setting of the cement at the interface between the support and the mixture, or to enable better adhesion of the mixture on the support or to increase the roughness of the support.

The invention offers as other advantage that the mineral foam according to the invention has excellent thermal properties, and notably a very low thermal conductivity. Reducing the thermal conductivity of building materials is highly desirable since it makes it possible to obtain a saving in heating energy in residential or working buildings. In addition, the mineral foam according to the invention makes it possible to obtain good insulation performances over small thicknesses and thus to preserve the surfaces and habitable volumes. The thermal conductivity (also called lambda ($2k$)) is a physical quantity characterising the behaviour of materials during the transfer of heat by conduction. The thermal conductivity represents the quantity of heat transferred per surface unit and per time unit under a temperature gradient. In the international units system, the thermal conductivity is expressed in watts per Kelvin metre, ($W \cdot m^{-1} \cdot K^{-1}$). Classical or traditional concretes have a thermal conductivity between 1.3 and 2.1 measured at 23° C. and 50% relative humidity.

The mineral foam according to the invention has a thermal conductivity comprised from 0.03 to 0.5 W/m·K, preferably from 0.04 to 0.15 W/m·K, more preferentially from 0.045 to 0.10 W/m·K.

The invention offers as another advantage that the mineral foam according to the invention has good mechanical properties, and notably good compressive strength compared with known mineral foams. The mineral foam according to the invention has a compressive strength comprised from 0.04 to 5 MPa, preferably from 0.05 to 2 MPa, more preferentially from 0.05 to 1 MPa.

The invention also relates to the use of the mineral foam according to the invention as building material. For example the mineral foam according to the invention may be used to pour walls, floors, roofs on a worksite. It is also envisaged to produce elements prefabricated in a preproduction factory from the foam according to the invention such as blocks, panels.

The mineral foam according to the invention may be poured onto walls on a worksite.

The invention also relates to the use of the mineral foam according to the invention as insulating material, in particular as thermal or phonic insulating material.

Advantageously, the mineral foam according to the invention makes it possible in certain cases to replace glass wool, mineral wool, asbestos or insulants made of polystyrene and polyurethane.

Advantageously, the mineral foam according to the invention may be used for backfilling or filling of an empty or hollow space of a building, a wall, a partition, a masonry block for example a breeze-block, a brick, of a floor or of a ceiling. Such materials or composite building elements comprising the mineral foam according to the invention are also objects of the invention per se.

Advantageously, the mineral foam according to the invention may be used as plugging material.

Advantageously, the mineral foam according to the invention may be used as façade covering for example to insulate a building from the outside. In this case, the mineral foam according to the invention could be coated with a finish coat.

The subject matter of the invention is also a system comprising the mineral foam according to the invention. The foam may be present in the system as insulating material. It may be poured vertically between two walls, chosen for example from concrete cast walls, brick walls, plasterboard, wooden sheet, for example wood panels with oriented thin strips, fibre-cement panels, the whole forming the system.

The system according to the invention is advantageously capable of withstanding or reducing air and thermo-hydric transfers, that is to say that this element has a controlled permeability to transfers of air, of water in the form of vapour or liquid.

The system according to the invention preferably comprises at least one framework or structural element. This framework may be made of concrete (columns/beams), metal (uprights or rails), wood, plastic or composite material or synthetic material. The mineral foam according to the invention may also coat a structure for example of wire mesh type (plastic, metal) or a pillar or beam of a building.

The system according to the invention may be used to produce or manufacture a cladding, an insulation system, or a partition, for example a separating partition, internal partition or a rigid wall lining.

The invention also relates to a building element comprising the mineral foam according to the invention.

When the mineral foam according to the invention is intended to be projected on a vertical wall, said wall could be provided with elements which facilitate the adherence of the foam, for example metal wire meshes or wire meshes based on plastic materials, spaced or not from the wall, and joined together or not with the wall. Vertical armatures could be positioned along the wall to serve as anchoring points for wire meshes. These wire meshes could be simple horizontal wires.

Figure 2:
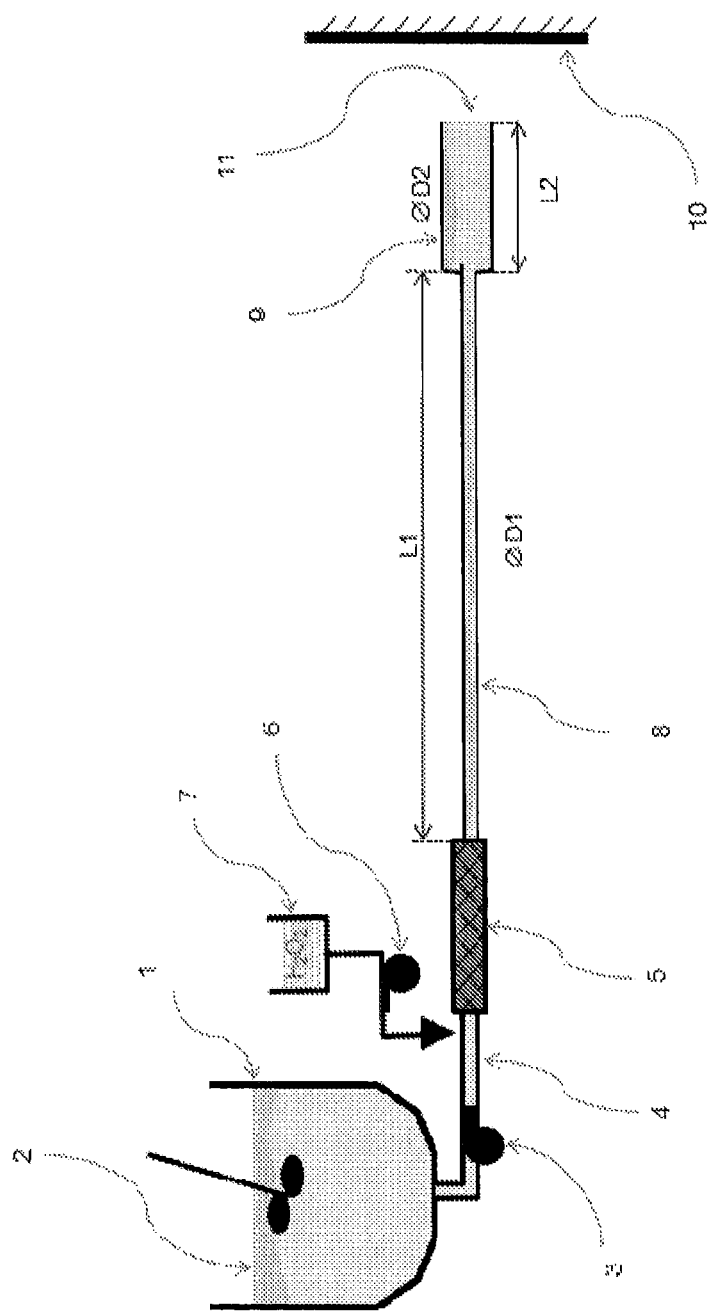
FIG. 2 is a diagram illustrating an exemplary embodiment of a device for implementing the method according to the invention.

In the example shown in FIG. 2, the device comprises a tank provided with a stirrer (1), a first pump (3), a first pipe (4), a static mixer (5), a second pump (6), a recipient (7), a second pipe (8), an output element (9) and a support (10). The mixture (2) is the mixture of step (i), and is contained in the tank (1). The pore-forming agent is contained in the recipient (7). They are continuously pumped independently by the pumps (3) and (6) and mixed by means of the static mixer (5). The pipe (8) and the output element (9) form a piping which may comprise additional elements of different sections and of different lengths. The dimensions (L1) and (D1) of the pipe (8) and the dimensions (L2) and (D2) of the output element (9) are chosen in such a way that the head losses in the piping remain compatible with the characteristics of the discharges, such as the flow rates and the speeds at the output of the piping, and with the pumping means. The pipe (8) and the output element (9) are also chosen as a function of the speed of release of oxygen in the piping, and in particular the ratio between the expected release in the piping and that expected after the output (11) of the piping, and the regularity of the flow. Generally, the diameter (D2) of the final part of the piping (output (11)) is chosen as a means of regulating the speed of ejection of the foam while maintaining the integrity of the jet. In the density range according to the invention, the expansion is not complete at the output of the piping (11), and ends on the support (10). Generally, at least 20% of the expansion remains to occur on the support (10).

Other embodiments of a device for applying the method according to the invention may be envisaged.

Figure 1:
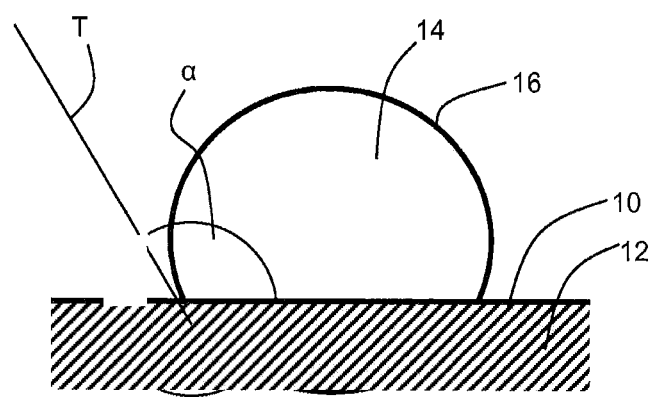
FIG. 1 is a diagram illustrating the principle of measuring a contact angle between a drop of water and a surface.

Method for Measuring a Wetting or Contact Angle:

FIG. 1 illustrates the principle for measuring a wetting angle between a solid surface 10 of a sample 12 made of concrete and a drop 14 of a liquid deposited on the surface 10. The reference 16 designates the liquid/gas interface between the drop 14 and ambient air. FIG. 1 is a cross-section along a plane perpendicular to the surface 10. In the section plane, the wetting angle α corresponds to the angle, measured from the inside of the drop 14 of liquid, between the surface 10 and the tangent T to the interface 16 at the point of intersection between the solid 10 and the interface 16.

To carry out the measurement of the wetting angle, the sample 12 is placed in a room at a temperature of 20° C. and a relative humidity of 50%. A drop of water 14 having a volume of 2.5 µL is placed on the surface 10 of the sample 12. The angle measurement is carried out by an optical method, for example using a drop shape analysis device, for example the DSA 100 device commercialised by Krüss. The measurements are repeated five times and the value of the contact angle measured between the drop of water and the support is equal to the average of these five measurements.

Particle Size Laser Method

The particle size curves of the different powders are obtained from a Mastersizer 2000 (year 2008, series MALI 020429) type laser particle size analyser sold by the Malvern Company.

The measurement is carried out in an appropriate medium (for example, in aqueous medium) in order to disperse the particles; the size of the particles must be comprised from 1 µm to 2 mm. The luminous source is constituted of a red He—Ne laser (632 nm) and a blue diode (466 nm). The optical model is that of Fraunhofer, the calculation matrix is of polydisperse type.

A background noise measurement is firstly carried out with a pump speed of 2000 rpm, a stirrer speed of 800 rpm and a noise measurement over 10 s, in the absence of ultrasounds. It is then checked that the luminous intensity of the laser is at least equal to 80%, and that a decreasing exponential curve is obtained for the background noise. If this is not the case, the lenses of the cell have to be cleaned.

A first measurement is next carried out on the sample with the following parameters: pump speed of 2000 rpm, stirrer speed of 800 rpm, absence of ultrasounds, obscuration limit between 10 and 20%. The sample is introduced to have an obscuration slightly greater than 10%. After stabilisation of the obscuration, the measurement is carried out with a duration between the immersion and the measurement set at 10 s. The measurement time is 30 s (30000 diffraction images analysed). In the granulogram obtained, it is necessary to take account of the fact that a part of the population of the powder may be agglomerated.

A second measurement is then carried out (without emptying the tank) with ultrasounds. The pump speed is taken to 2500 rpm, the stirring to 1000 rpm, the ultrasounds are emitted at 100% (30 watts). This regime is maintained for 3 minutes, then the initial parameters are returned to: pump speed of 2000 rpm, stirrer speed of 800 rpm, absence of ultrasounds. At the end of 10 s (to evacuate potential air bubbles), a 30 s measurement (30000 images analysed) is carried out. This second measurement corresponds to a powder de-agglomerated by ultrasound dispersion.

Each measurement is repeated at least twice to check the stability of the result. The apparatus is calibrated before each working session by means of a standard sample (silica C10 Sifraco) of which the particle size curve is known. All the measurements presented in the description and the ranges announced correspond to the values obtained with ultrasounds.

Method for Measuring the BLAINE Specific Surface Area

The specific surface of the different materials is measured as follows.

The Blaine method at 20° C. with a relative humidity not exceeding 65% using a Blaine Euromatest Sintco apparatus complying with the European standard EN 196-6. Before the measurement of the specific surface, the wet samples are dried in an oven until a constant weight is obtained at a temperature from 50 to 150° C. (the dried product is next ground to obtain a powder of which the maximum size of the particles is less than or equal to 80 μm).

EXAMPLES

The method according to the invention was put into effect to prepare mineral foams of formulas 391, 390-a, 390-b and 400. A comparative example 389 was also prepared in such a way as to highlight the advantageous aspects of the method according to the invention.

Materials:

The cement used is a Portland CEMI 52.R cement from the Lafarge Saint Pierre la Cour cement plant. The letter "R" corresponds to the definition of the Standard NF EN 197-1, version of April 2012. This cement was ground until a Blaine specific surface area of 8000 cm²/g was obtained.

The water reducing agent is a new generation high water reducing superplastifier, based on modified polycarboxylate sold under the name of Chryso Fluid Premia 180 and supplied by the Chryso Company. The dry content of Premia 180 is 50%, percentage by weight. The water reducing agent does not contain antifoaming agent.

The ultrafine particles are particles of precipitated calcium carbonate sold under the name Socal 312 and supplied by the Solvay PCC Company. These ultrafine particles have a contact angle varying from 90° to 130° as measured according to the method described above and a D50 of the particles of 40 nm as measured with the method described in the document EP1 740 649.

The transition metal salt is manganese sulphate monohydrate supplied by the Sigma Aldrich Company.

The mineral addition is a calcareous powder sold under the name of BL200 Orgon and supplied by the Omya Company for the formulas 389, 391, 390-a and 390-b and a Dunkirk slag (Origin Arcelor) for the formula 400. The D50 of BL200 is 6 μm and the D50 of the slag is 14.2 μm.

The hydration accelerator of the cement is aluminium sulphate of concentration 1 mole/l prepared from hydrated aluminium sulphate (14H$_2$O) in powder supplied by the VWR Company.

The pore-forming agent is 30% hydrogen peroxide supplied by the VWR Company.

The water is tap water.

Equipment Used:

Rayneri Mixers:
A R 602 EV (2003) model mixer supplied by the Rayneri Company. The mixer is composed of a frame on which tanks ranging from 10 to 60 litres are positioned. The 10 L tank was used with a paddle type blade adapted to the volume of the tank. This blade exerts a rotational movement on itself accompanied by a planetary movement around the axis of the tank.

Pumps:
A Seepex™ eccentric screw pump (I) of MD 006-24 type, commission n° 244920.
A Seepex™ eccentric screw pump (II) of MD 006-24 type, commission n° 278702.

Static Mixer:
A static mixer composed of 32 helicoidal elements of Kenics type of 19 mm diameter referenced 16La632 from ISOJET I. Production of Mineral Foams Preparation of the Paste for the Formulas 389, 391, 390-a and 390-b:

The paste is prepared by mixing the compounds of table I in the respective proportions indicated in said table. The paste is next mixed with water in a planetary mixer (Rayneri brand) for 5 min. The density of the foam in the fresh state after expansion is measured.

TABLE 1

| | Formulations | | | | |
|---|---|---|---|---|---|
| | 389 | 391 | 390-a | 390-b | 400 |
| cement* | 71.9 | 71.9 | 71.9 | 71.9 | 71.46 |
| water reducing agent* | 0.2 | 0.2 | 0.2 | 0.2 | 0.4 |
| ultrafine particles* | 4.83 | 4.83 | 4.83 | 4.83 | 4.8 |
| transition metal salt* | 0.72 | 1.43 | 0.36 | 0.36 | 1.6 |
| mineral addition* | 22.35 | 21.64 | 22.71 | 22.71 | 21.74 |
| total | 100 | 100 | 100 | 100 | 100 |
| pore-forming agent** | 7.1 | 4.6 | 3 | 5.6 | 4.5 |
| water/cement*** | 0.76 | 0.76 | 0.76 | 0.76 | 0.76 |

*the values are percentages expressed by weight with respect to the weight
**percentages by weight with respect to the weight of cement
***ratio by weight Before application of the foam on a breeze-block wall serving as support, the wall is treated, by means of a spray, by aspersion of a 1 mole/l solution of aluminium sulphate.

Then the paste is continuously pumped by means of a screw pump (Seepex (I) brand) in a main piping of 15 mm diameter. Simultaneously, the aqueous solution of hydrogen peroxide is pumped by means of another screw pump (Seepex (II) brand) and continuously injected into the piping in which the paste flows. The respective pumping flow rates are indicated in table 2. The mixing between the paste and the solution is accelerated by the presence of a static mixer placed in the main piping and located immediately downstream of the injection point of the hydrogen peroxide solution. The piping downstream of the mixer static is of a length of 5.5 m.

TABLE 2

| | Formulations | | | |
|---|---|---|---|---|
| | 389 | 391 | 390-a | 390-b |
| Flow rate kg/min | 5.5 | 5.5 | 5.5 | 5.5 |
| Flow rate kg/min (H$_2$O$_2$) | 0.590 | 0.37 | 0.24 | 0.52 |

The piping is equipped with an applicator (diameter adapter) which increases to 20 mm the diameter of the output tubing over a length of 20 cm.

It will be observed that the paste obtained at the output of the applicator is only partially aerated (less than 50% of the total fraction of oxygen is incorporated in the paste at this stage) and its expansion continues after deposition. The paste is deposited on the wall by the sole means of the output jet, which maintains its integrity up to the point of deposition. The density of the foam in the fresh state after expansion is measured.

The wall is covered by progressively varying the position of the deposition point, until the wall is entirely covered by the foam after complete expansion. A layer of around 3 cm is thereby obtained. The system is left as is until the setting of the cement has started, i.e. around 2.5 hours at ambient temperature.

The operation of deposition of foam is reiterated a second time, exactly in the same conditions as the first time. A second layer of around 3 cm is deposited. The paste is then floated to smooth out the unevenness and to give it a finished aspect.

Preparation of the Paste for the Formula 400:

The percentages being expressed by weight, the paste is prepared by mixing the following compounds:

71.46% of cement ground until a Blaine specific surface area of 8000 cm$^2$/g is reached.

22.2% of Dunkirk slag 4.80% of treated ultrafine particles (Socal 312 from Solvay PCC)

1.6% of manganese sulphate monohydrate 0.4% of Premia 180 superplastifier 4.5%, calculated with respect to the cement, of $H_2O_2$ are added in the form of a 30% solution.

II. Analysis of the Mineral Foam

II.1 Thermal Conductivity of Mineral Foams

The thermal conductivity (λ) was measured using a thermal conductivity measurement apparatus: CT-meter supplied by the Alphis-ERE Company (Resistance 50, 50 mm wire probe). The measurement was carried out on samples dried at 45° C. up to constant weight. The sample was next cut into two equal pieces using a saw. The measurement probe was placed between the two flat faces of these two halves of sample (sawn sides). Heat was transmitted from the source to the thermocouple through the material surrounding the probe. The rise in temperature of the thermocouple was measured as a function of time and made it possible to calculate the thermal conductivity of the sample.

II.2 Density of the Mineral Foams

The wet density of the foamed cement grouts was measured by weighing cubes at the moment of pouring and after complete expansion.

The dry density of the samples was measured on samples dried at 45° C. up to constant weight, still by weighing of cubes.

TABLE 3

| | Formulations | | | | |
|---|---|---|---|---|---|
| | 389 | 391 | 390-a | 390-b | 400 |
| λ in W/m · K | 0.048 | 0.072 | 0.11 | 0.051 | 0.070 |
| Density in the fresh state in kg/m$^3$ | 80 | 200 | 340 | 98 | 189 |
| Density in the dry state in kg/m$^3$ | 70 | 160 | 271 | 80 | 130 |

The invention claimed is:

1. A method for the continuous production of a mineral foam of which the density in the dry state (d) is comprised from 40 to 600 kg/m$^3$, comprising the following steps:
    (i) mixing
        cement;
        a water reducing agent;
        0.5 to 10%, % by weight with respect to the total weight of cement, of ultrafine particles having a liquid-solid contact angle comprised from 30° to 140°, and of which the D50 is comprised from 10 to 600 nm;
        water, with a water/cement weight ratio comprised from 0.3 to 2.5;
    (ii) adding to the mixture from 0.5 to 10% of a pore-forming agent, % by weight with respect to the weight of cement;
    (iii) applying the mixture obtained at step (ii) on a support;
    (iv) leaving the mixture to expand on the support.

2. The method according to claim 1, wherein the cement of the mixture of step (i) is a cement of which the Blaine specific surface area is comprised from 5000 to 9000 cm$^2$/g.

3. The method according to claim 1, wherein there is no foaming agent in the mixture of step (i) or (ii).

4. The method according to claim 1, wherein the mixture of step (i) or step (ii) further comprises a transition metal salt.

5. The method according to claim 4, wherein the transition metal salt is a manganese salt or an iron salt.

6. The method according to claim 1, wherein the mixture of step (i) further comprises a mineral addition of which the particles have a D50 comprised from 0.1 to 4 mm.

7. The method according to claim 6, wherein the mineral addition is selected from the group consisting of a pozzolan, a slag, calcium carbonate, a fly ash, a sand and mixtures thereof.

8. The method according to claim 1, wherein the pore-forming agent added at step (ii) is a solution of hydrogen peroxide, a solution of peroxomonosulphuric acid, a solution of peroxodisulfphuric acid, a solution of alkaline peroxides, a solution of alkaline earth peroxides, a solution of organic peroxide, a suspension of particles of aluminium or mixtures thereof.

9. The method according to claim 8, wherein the organic peroxide is peroxoacetic acid or peroxobenzoic acid.

10. The method according to claim 1, wherein the mixture of step (i) further comprises a hydration accelerator of the cement.

11. The method according to claim 10, wherein the hydration accelerator is calcium chloride.

12. The method according to claim 1, wherein the mixture obtained at step (ii) is not fractionated.

13. The method according to claim 1, wherein at step (iii), the mixture is applied without using a spray nozzle.

14. The method according to claim 1 wherein step (iii) is carried out without a spray.

15. The method according to claim 1, wherein the support used at step (iii) is treated prior to the application of the mixture obtained at step (ii).

16. A mineral foam capable of being obtained according to the method of claim 1.

17. A method comprising utilizing the mineral foam according to claim 16 as insulation material.

18. The method according to claim 17, wherein the insulation material is a thermal or phonic insulation material.

* * * * *